(12) United States Patent
Yang

(10) Patent No.: US 12,475,129 B2
(45) Date of Patent: Nov. 18, 2025

(54) METHOD FOR RECORDING BIG DATA IN OBJECT STORAGE AND QUERYING THE RECORDED BIG DATA

(71) Applicant: Logpresso Inc., Seoul (KR)

(72) Inventor: Bongyeol Yang, Seoul (KR)

(73) Assignee: Logpresso Inc., Seoul (KR)

( * ) Notice: Subject to any disclaimer, the term of this patent is extended or adjusted under 35 U.S.C. 154(b) by 0 days.

(21) Appl. No.: 18/930,991

(22) Filed: Oct. 29, 2024

(65) Prior Publication Data

US 2025/0200052 A1    Jun. 19, 2025

(30) Foreign Application Priority Data

Dec. 18, 2023    (KR) .................... 10-2023-0184300

(51) Int. Cl.
  *G06F 16/2457*    (2019.01)
  *G06F 16/22*      (2019.01)
  *G06F 16/248*     (2019.01)

(52) U.S. Cl.
  CPC ...... *G06F 16/24573* (2019.01); *G06F 16/221* (2019.01); *G06F 16/248* (2019.01)

(58) Field of Classification Search
  CPC . G06F 16/24573; G06F 16/221; G06F 16/248
  See application file for complete search history.

(56) References Cited

U.S. PATENT DOCUMENTS

| | | | |
|---|---|---|---|
| 11,537,633 B2 | 12/2022 | Mallipeddi et al. | |
| 2013/0031308 A1* | 1/2013 | De Spiegeleer | H04L 67/51 711/E12.024 |
| 2017/0177476 A1* | 6/2017 | Goren | G06F 12/06 |
| 2020/0004772 A1 | 1/2020 | Maybee et al. | |
| 2020/0272623 A1 | 8/2020 | Aggour et al. | |
| 2023/0185816 A1* | 6/2023 | Edara | G06F 16/221 707/776 |
| 2024/0256394 A1* | 8/2024 | Jain | G06F 16/125 |

FOREIGN PATENT DOCUMENTS

| | | |
|---|---|---|
| KR | 10-2017-0141538 A | 12/2017 |
| KR | 10-2019-0143520 A | 12/2019 |
| KR | 10-2021-0055514 A | 5/2021 |
| KR | 10-2022-0080329 A | 6/2022 |
| KR | 10-2023-0083993 A | 6/2023 |
| WO | 2019/195211 A1 | 10/2019 |

* cited by examiner

*Primary Examiner* — William P Bartlett
(74) *Attorney, Agent, or Firm* — United One Law Group LLC; Kongsik Kim; Jhongwoo Peck

(57) ABSTRACT

A computer implemented method for recording data includes a first step of recording data of a predetermined first time-range in a block storage; and a second step of performing a batch operation of merging data in the block storage to record the generated block data in an object storage, if there is no data inflow for a predetermined second time-range or if the sum of the capacities of new blocks recorded in the block storage exceeds a predetermined capacity or the sum of the number of records exceeds a predetermined number of data. The block data recorded in the second step is data where the time range of a merged column is placed at the front and the data is merged based on a column name.

4 Claims, 7 Drawing Sheets

FIG. 3

| TYPE OF COLUMN A | LENGTH OF COLUMN A | SET OF DATA OF COLUMN A |
|---|---|---|
| TYPE OF COLUMN B | LENGTH OF COLUMN B | SET OF DATA OF COLUMN B |

FIG. 4

| MINIMUM TIME OF BLOCK | MAXIMUM TIME OF BLOCK | NUMBER OF MERGED BLOCKS |
|---|---|---|
| #1 MINIMUM TIME | #1 MAXIMUM TIME | #2 MAXIMUM TIME |
| #3 MINIMUM TIME | #3 MAXIMUM TIME | NAME OF COLUMN A |
| LENGTH OF NAME OF COLUMN A | | |
| TYPE OF #1 DATA SET OF COLUMN A | LENGTH OF #1 DATA SET OF COLUMN A | |
| TYPE OF #3 DATA SET OF COLUMN A | LENGTH OF #3 DATA SET OF COLUMN A | LENGTH OF #2 DATA SET OF COLUMN A |

1 DATA SET OF COLUMN A

2 DATA SET OF COLUMN A

3 DATA SET OF COLUMN A

| LENGTH OF NAME OF COLUMN B | NAME OF COLUMN B | TYPE OF #1 DATA SET OF COLUMN B | LENGTH OF #1 DATA SET OF COLUMN B |
| --- | --- | --- | --- |
| LENGTH OF #2 DATA SET OF COLUMN B | TYPE OF #2 DATA SET OF COLUMN B | TYPE OF #3 DATA SET OF COLUMN B | LENGTH OF #3 DATA SET OF COLUMN B |

1 DATA SET OF COLUMN B

2 DATA SET OF COLUMN B

3 DATA SET OF COLUMN B

METHOD FOR RECORDING BIG DATA IN OBJECT STORAGE AND QUERYING THE RECORDED BIG DATA

CROSS-REFERENCE TO RELATED APPLICATION

This application claims priority to Korean Patent Application No. 10-2023-0184300 filed on Dec. 18, 2023, which is incorporated herein by reference in its entirety.

TECHNICAL FIELD

The present disclosure relates to a method for recording data in object storage and querying the recorded data with high speed. More specifically, it relates to a method for recording unstructured big data in object storage and querying the big data with high speed and efficiently.

BACKGROUND

Conventionally, big data systems which collect, record and analyze petabyte-scale data have been mainly operated in on-premise. Although it is possible to record and analyze big data systems in cloud environments, allocating large-scale block storage to build the same environment as on-premise was substantially impossible due to the enormous costs involved.

Global cloud providers such as AWS Athena and Azure Data Lake Storage provide the ability to store and query structured data at high speeds based on object storage. AWS Athena processes Parquet format files in AWS S3 at high speed, and Azure Data Lake Storage processes Parquet format files stored in Azure Blob Storage at high speed. However, these current services require a fixed schema for column acceleration, which makes it difficult to process unstructured big data, such as large-scale log data, due to various problems.

PRIOR ART REFERENCE

Korean Patent Application Publication No. 10-2023-0083993 (Published on Jun. 12, 2023)

SUMMARY

The object of the present disclosure is to provide a data recording and querying method that enables fast and efficient analysis of unstructured big data by extracting column data at high speed while storing unstructured big data in object storage in a cloud or on-premise environment without fixing the schema.

The present disclosure provides a computer-implemented method for recording data, which comprises a first step of recording data of a predetermined first time-range in a block storage; and a second step of performing a batch operation of merging data in the block storage to record the generated block data in an object storage, if there is no data inflow for a predetermined second time-range or if the sum of the capacities of new blocks recorded in the block storage exceeds a predetermined capacity or the sum of the number of records exceeds a predetermined number of data. The block data recorded in the second step is data where the time range of a merged column is placed at the front and the data is merged based on a column name.

The method of the present discloses can further comprise a third step of recording metadata in a block metadata database. The data recorded in the block metadata database in the third step includes table metadata, object metadata, block metadata, and block column metadata; the table metadata includes a table ID, a table name, and a table creation time; the object metadata includes an object ID, a table ID, an object URL, an object size, the number of records, a minimum time, a maximum time, and an object creation time; the block metadata includes a block ID, a table ID, an object ID, the number of records, a minimum time, a maximum time, a start position of the block, and a block creation time; and the block column metadata includes a column ID, a block ID, a column name, a column type, an offset in the block, a length of the block, and a creation time.

The present disclosure also provides a computer implemented method for querying data recorded by the above methods. The method for querying data of the present disclosure comprises a fourth step of receiving a query execution request from a client; a fifth step of parsing the query received in the fourth step to extract information on a target to be queried; a sixth step of querying the block metadata database for block metadata based on the information extracted in the fifth step; a seventh step of requesting the block storage to execute the query and receiving a query result; an eighth step of requesting the object storage to execute the query and receiving a query result; and a ninth step of merging the query result of the seventh step and the query result of the eighth step and returning the merged result to the client.

The present disclosure also provides a computer-implemented system comprising one or more processors and one or more non-transitory computer-readable media storing computer-executable instructions that, when executed, cause the one or more processors to perform the above methods.

According to the present disclosure, a method for quickly querying and analyzing unstructured big data stored in object storage is provided.

BRIEF DECRIPTION OF THE DRAWINGS

FIG. 3 is a layout of data recorded in block storage.

FIG. 4 is a layout of data recorded in object storage according to the present disclosure.

Figure 1:
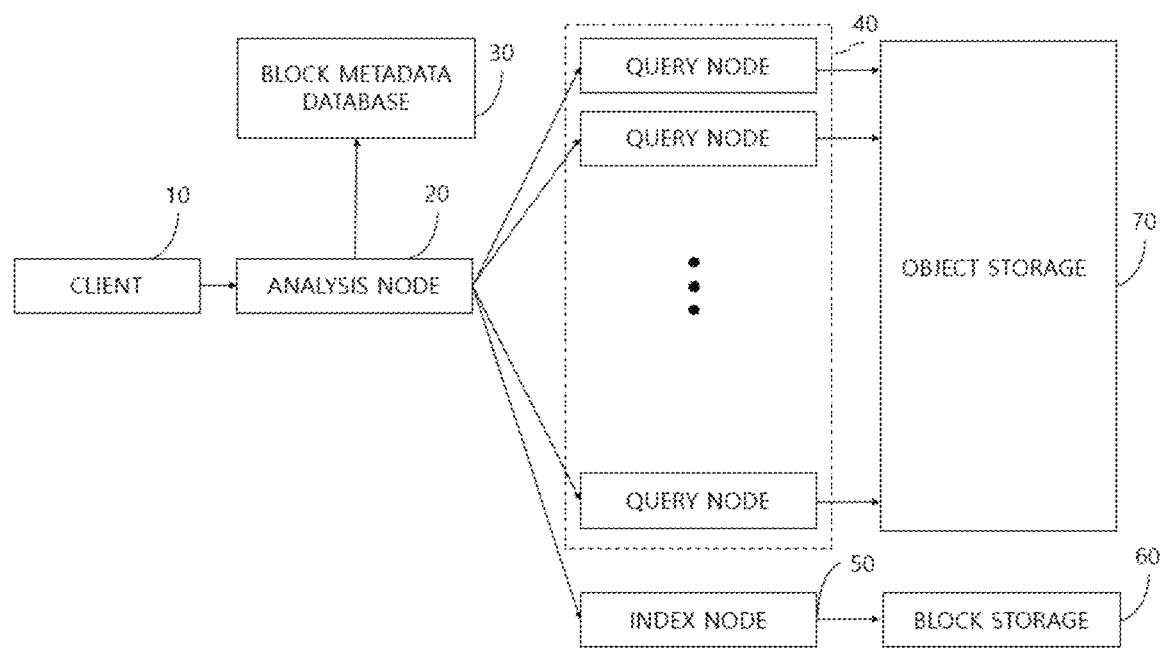
FIG. 1 is an example of an environment in which the data query method according to the present disclosure is executed.

It should be understood that the above-referenced drawings are not necessarily to scale, presenting a somewhat simplified representation of various preferred features illustrative of the basic principles of the disclosure. The specific design features of the present disclosure will be determined in part by the particular intended application and use environment.

DETAILED DESCRIPTION

Hereinafter, the present disclosure will be described in detail with reference to the accompanying drawings. As those skilled in the art would realize, the described embodiments may be modified in various different ways, all without departing from the spirit or scope of the present disclosure. Further, throughout the specification, like reference numerals refer to like elements.

In this specification, the order of each step should be understood in a non-limited manner unless a preceding step must be performed logically and temporally before a following step. That is, except for the exceptional cases as described above, although a process described as a following step is preceded by a process described as a preceding step, it does not affect the nature of the present disclosure, and the scope of rights should be defined regardless of the order of the steps. In addition, in this specification, "A or B" is defined not only as selectively referring to either A or B, but also as including both A and B. In addition, in this specification, the term "comprise" has a meaning of further including other components in addition to the components listed.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. The term "coupled" denotes a physical relationship between two components whereby the components are either directly connected to one another or indirectly connected via one or more intermediary components.

The term "module" or "unit" means a logical combination of a universal hardware and a software carrying out required function.

The terms "first," "second," or the like are herein used to distinguishably refer to same or similar elements, or the steps of the present disclosure and they may not infer an order or a plurality.

In this specification, the essential elements for the present disclosure will be described and the non-essential elements may not be described. However, the scope of the present disclosure should not be limited to the invention including only the described components. Further, it should be understood that the invention which includes additional element or does not have non-essential elements can be within the scope of the present disclosure.

The method of the present disclosure can be an electronic arithmetic device.

The electronic arithmetic device can be a device such as a computer, tablet, mobile phone, portable computing device, stationary computing device, server computer etc. Additionally, it is understood that one or more various methods, or aspects thereof, may be executed by at least one processor. The processor may be implemented on a computer, tablet, mobile device, portable computing device, etc. A memory configured to store program instructions may also be implemented in the device(s), in which case the processor is specifically programmed to execute the stored program instructions to perform one or more processes, which are described further below. Moreover, it is understood that the below information, methods, etc. may be executed by a computer, tablet, mobile device, portable computing device, etc. including the processor, in conjunction with one or more additional components, as described in detail below. Furthermore, control logic may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Certain exemplary embodiments will now be described to provide an overall understanding of the principles of the structure, function, manufacture, and use of the devices and methods disclosed herein. One or more examples of these embodiments are illustrated in the accompanying drawings. Those skilled in the art will understand that the devices and methods specifically described herein and illustrated in the accompanying drawings are non-limiting exemplary embodiments and that the scope of the present disclosure is defined solely by the claims. The features illustrated or described in connection with one exemplary embodiment may be combined with the features of other embodiments. Such modifications and variations are intended to be included within the scope of the present disclosure.

FIG. 1 illustrates an example environment where the data query method according to the present disclosure is executed.

The environment comprises a client (10), an analysis node (20), a block metadata database (30), query nodes (40), an index node (50), block storage (60), and object storage (70). At least some or all of the analysis node (20), the block metadata database (30), the query nodes (40), the index node (50), the block storage (60), and the object storage (70) can be provided in a cloud environment. The method according to the present disclosure can also be provided in an on-premise. In that case, at least some or all of the above components can be provided in the on-premise environment.

The analysis node (20) parses the query received from the client (10) and searches the block metadata database (30) for block metadata according to the query, under the condition of such as time range, table, and target column.

Figure 6:
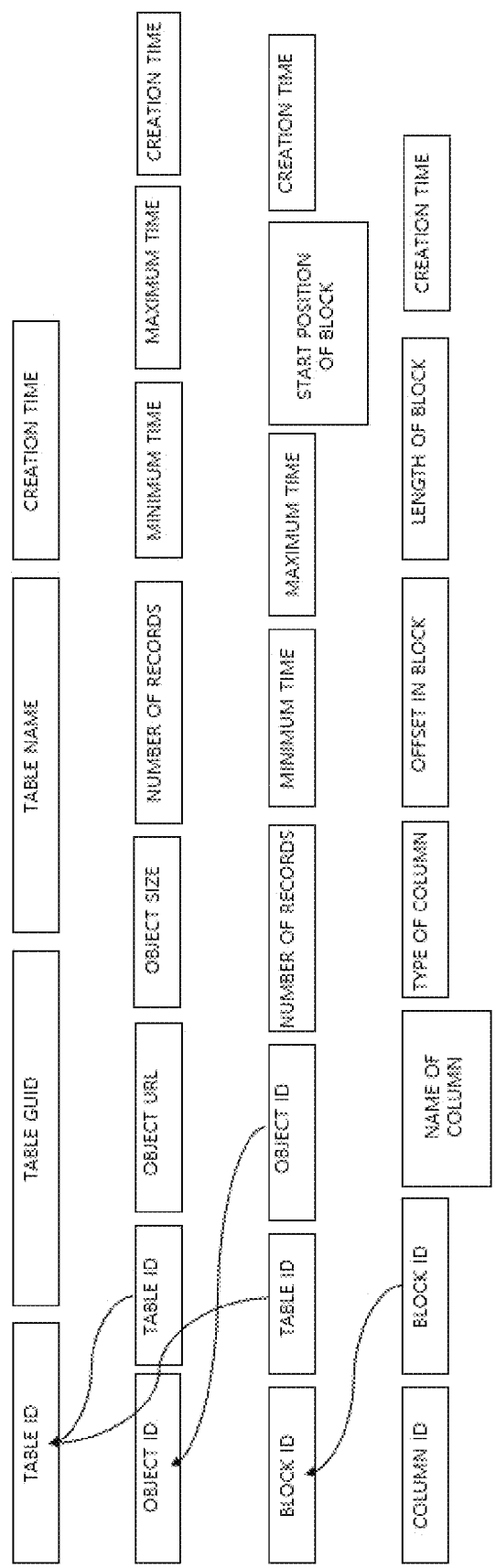
FIG. 6 is an example of information recorded in the block metadata database.

The block metadata database (30) can use a relational database or a file, and as shown in FIG. 6, it can include table metadata, object metadata, block metadata, and block column vector metadata.

The table metadata can include table ID, table GUID, table name, table creation time and the like.

The object metadata can include object ID, table ID, object URL, object size, number of records, minimum and maximum time of merged block data, creation time, object creation date and time and the like. The number of records can be the sum of the number of records of all subordinate block metadata. The minimum time can be the smallest value among the minimum times of all subordinate block metadata. The maximum time can be the largest value among the maximum times of all subordinate block metadata.

The block metadata can include block ID, table ID, object ID, number of records, minimum time, maximum time, start position of block, creation time and the like.

The block column vector metadata can include column ID, block ID, column name, column type, offset in block, block length, creation time and the like.

The block metadata database (30) returns a set of [column name, column type, minimum time, maximum time, byte offset, length in bytes] for each object URL for the requested search range received from the analysis node (20).

For example, if you want to query only statistics for a specific source IP between 2:00 and 4:00 on Dec. 13, 2023, the column name that matches the specified table ID and the specified source IP and all objects and their subordinate block column vector metadata, the minimum time and the maximum time of which overlaps 2:00 to 4:00 are searched in the block metadata database (30). Thereafter, the blocks recorded in the object storage (70) related to the statistics is retrieved.

It is preferred to provide a plurality of query nodes (40). The query nodes execute queries based on metadata transmitted from the analysis node (20) and the like.

The index node (50) primarily writes data to the block storage (60), and under certain conditions, performs a batch job to move the data recorded in the block storage (60) to the object storage (70) and a role of recording the newly written information in the object storage (70) in the block metadata database.

The object storage (70) can be, for example, AWS S3, Azure Blob Storage and the like. However, it is not limited to such cloud environments and can also be on-premise object storage (70).

Figure 2:
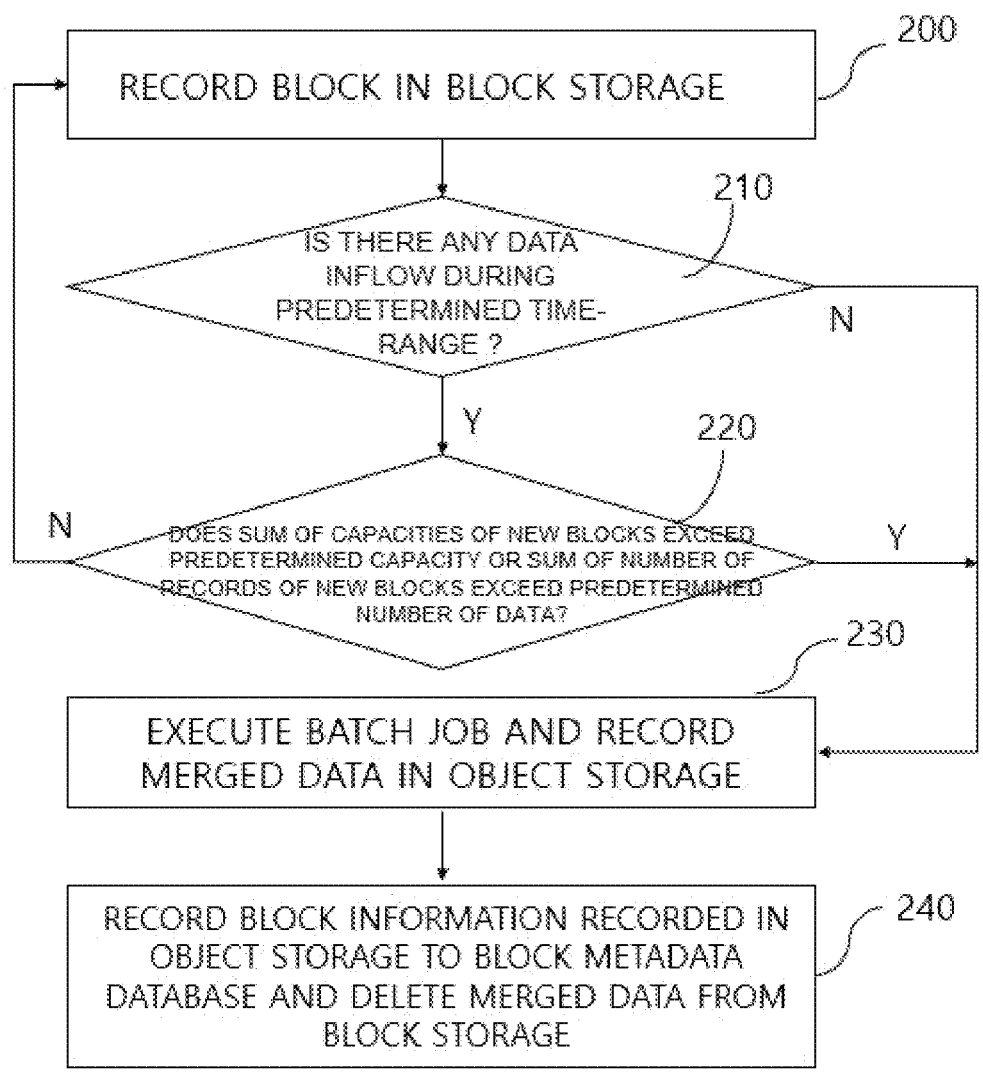
FIG. 2 is a flowchart of the data recording method according to the present disclosure.

FIG. 2 illustrates a flowchart of the data recording method according to the present disclosure.

When data comes in, it is first recorded in the block storage (60) (Step 200).

The index node (50) initially records the data in the block storage (60) by dividing it into a predetermined first time-range. It is determined whether there is any data inflow during a predetermined second time-range (Step 210). If there is no data inflow during the second time-range, a batch job is executed, and the merged data is recorded in the object storage (70) in step (230). The merged data can be data of a larger block created by merging small blocks of files recorded in the block storage (60).

Even if there is data inflow during the predetermined second time-range in step (210), if the sum of the capacities of the new blocks recorded in the block storage (60) exceeds a predetermined capacity, or if the sum of the number of records of the new blocks exceeds a predetermined number of data, the process can proceed to step (230) to execute a batch job and record the merged data in the object storage (70). The batch job can be executed directly by the index node (50) or using functions provided by AWS Lambda and the like.

The first time-range and the second time-range can be the same or set differently.

FIG. 3 shows an example of the column vector layout of a block recorded in the block storage (60). FIG. 4 shows an example of the layout of a larger block created by merge. For simplicity, it is assumed that the data is from a table with columns A and B, and each column has 3 sets of data.

As shown in FIG. 3, the column vector layout of a block stored in the block storage (60) includes the type of column A, the length of column A, the set of data of column A, the type of column B, the length of column B, and the set of data of column B.

In step (230), a plurality of blocks composed of the column vector layout in FIG. 3 are merged and are stored as data in the layout shown in FIG. 4. According to a preferred embodiment of the present disclosure, data can be concentrated as much as possible based on column names, which has the advantage of being able to read at once because the data is not scattered.

If blocks are merged into huge units, unnecessary time intervals may exist even within the same column. In order to resolve this problem and enable fast queries, the time range of each data set of the merged column can be placed at the front as shown in FIG. 4.

The "offset in block" in the block column metadata of FIG. 6 can be the start position of the blue part and the start position of the red part in the example layout of FIG. 4. The "block length" can be the length in bytes of the blue part and the length in bytes of the red part in FIG. 4. The exact position of the column data can be calculated by adding the offset in block to the start position of the block.

Once the merged data is recorded in the object storage (70), the process proceeds to step (240), where the index node (50) records the information of the merged block recorded in the object storage (70) in the block metadata database (30) and deletes the original data of the merged data from the block storage (60).

Figure 5:
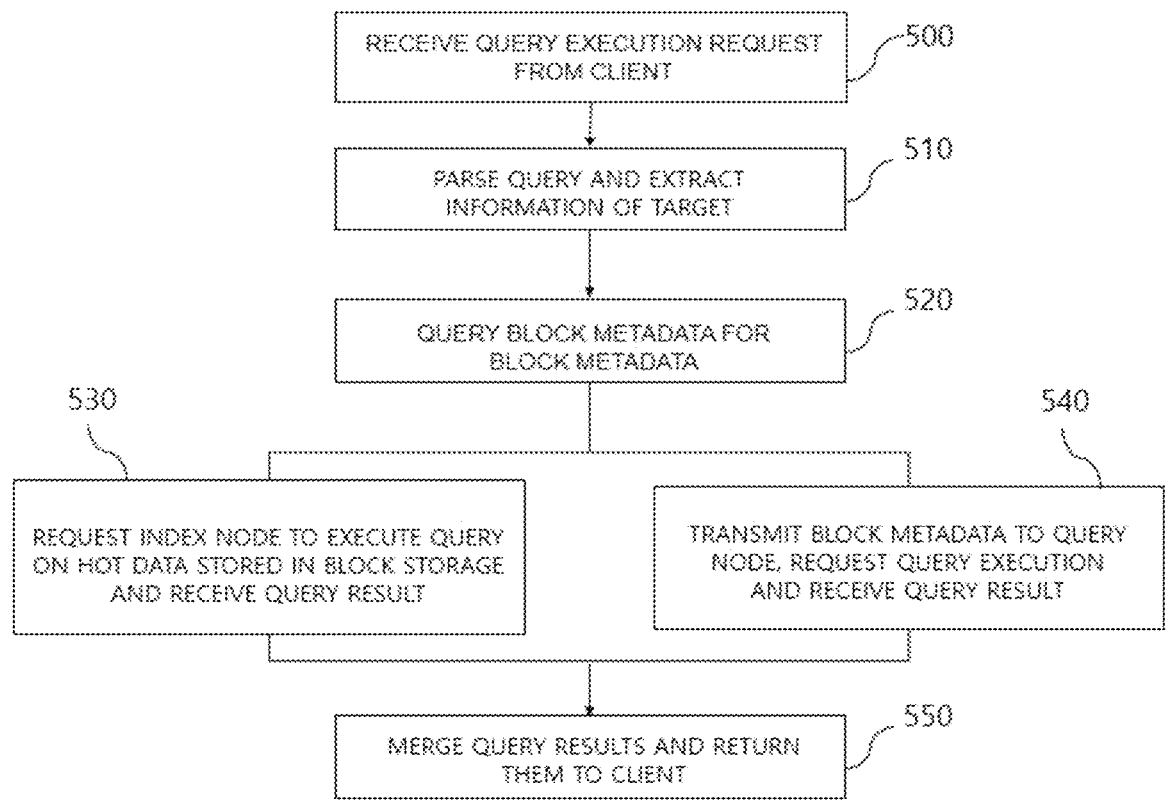
FIG. 5 is a flowchart of the data query method recorded according to the present disclosure.

FIG. 5 shows a flowchart of the data query method of the present disclosure for querying data recorded by the aforementioned method.

In step (500), the analysis node (20) receives a query execution request from the client (10). In step (510), the analysis node (20) parses the received query and extracts a list of the target table, column names, time range and the like that the query requests to search.

In step (520), the analysis node (20) queries the block metadata database for block metadata with the conditions extracted in step (510).

In step (530), the analysis node (20) requests the index node (50) to execute a query on the hot data stored in the block storage (60) and receives the query result.

In addition, in step (540), the analysis node (20) transmits the queried block metadata to each query node (40), requests query execution, and receives the query results.

In step (550), the analysis node (20) merges the query results of each query node (40) and the query result of the index node (50); and then returns them to the client (10).

Figure 7:
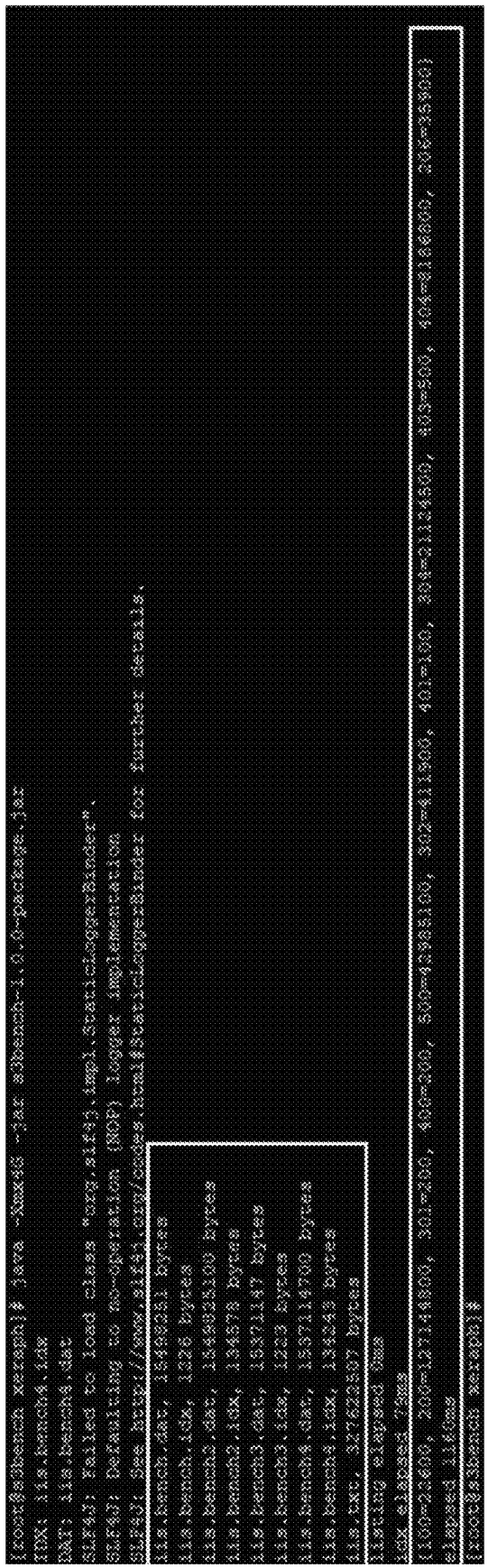
FIG. 7 is an example of a result screen obtained by querying data recorded in object storage according to the method of the present disclosure.

FIG. 7 shows an example of a result screen of the query results when querying large-scale data using the query method of the present disclosure.

FIG. 7 is a screen showing query result for aggregating HTTP status codes based on 30 GB of web logs under the conditions of a query node AWS EC2 i4i.4xlarge machine (16 vCPU, 128 GB RAM, maximum bandwidth of 25 Gbps).

As shown in FIG. 7, it took 79 ms to query the object list, and a total of 1.16 seconds to query the number of cases for each HTTP status code. This is a significantly faster speed compared to conventional data storage and query methods.

Considering the example in FIG. 7, it can be predicted that it would take about 40 seconds for 1 TB of data. If 6 query nodes (96 cores) are used, it can be predicted that the same operation on 1 TB data can be completed within 7 seconds.

Although the present disclosure has been described with reference to accompanying drawings, the scope of the present disclosure is determined by the claims described below and should not be interpreted as being restricted by the embodiments and/or drawings described above. It should be clearly understood that improvements, changes and modifications of the present disclosure disclosed in the claims and apparent to those skilled in the art also fall within the scope of the present disclosure. Accordingly, this description is to be taken only by way of example and not to otherwise limit the scope of the embodiments herein.

What is claimed is:

1. A computer implemented method comprising:
a first step of recording data of a predetermined first time-range in a block storage;
a second step of performing a batch operation of merging data in the block storage to generate block data and then recording the block data in an object storage in response to no data inflow being detected for a predetermined second time-range or in response to a sum of capacities of new blocks recorded in the block storage exceeding a predetermined capacity or a number of records exceeding a predetermined number of data; and
a third step of recording metadata in a block metadata database,
wherein time ranges of merged columns in the block data are placed at a front of the block data,
wherein the metadata recorded in the block metadata database in the third step includes table metadata, object metadata, block metadata, and block column metadata,
wherein the table metadata includes a table ID, a table name, and a table creation time,
wherein the object metadata includes an object ID, a table ID, an object URL, an object size, the number of records, a minimum time, a maximum time, and an object creation time,
wherein the block metadata includes a block ID, a table ID, an object ID, the number of records, a minimum time, a maximum time, a start position of the block, and a block creation time, and
wherein the block column metadata includes a column ID, a block ID, a column name, a column type, an offset in the block, a length of the block, and a creation time.

2. The computer implemented method of claim 1, further comprising:
a fourth step of receiving a query execution request from a client;
a fifth step of parsing the query received in the fourth step to extract information on a target to be queried;
a sixth step of querying the block metadata database for block metadata based on the information extracted in the fifth step;
a seventh step of requesting the block storage to execute the query and receiving a query result;
an eighth step of requesting the object storage to execute the query and receiving a query result; and
a ninth step of merging the query result of the seventh step and the query result of the eighth step and returning the merged result to the client.

3. A computer-implemented system comprising one or more processors and one or more non-transitory computer-readable media storing computer-executable instructions that, when executed, cause the one or more processors to perform a method comprising:
a first step of recording data of a predetermined first time-range in a block storage;
a second step of performing a batch operation of merging data in the block storage to generate block data and then recording the block data in an object storage in response to no data inflow being detected for a predetermined second time-range or if-in response to a sum of capacities of new blocks recorded in the block storage exceeding a predetermined capacity or a number of records exceeding a predetermined number of data; and
a third step of recording metadata in a block metadata database,
wherein time ranges of merged columns in the block data are placed at a front of the block data,
wherein the metadata recorded in the block metadata database in the third step includes table metadata, object metadata, block metadata, and block column metadata,
wherein the table metadata includes a table ID, a table name, and a table creation time,
wherein the object metadata includes an object ID, a table ID, an object URL, an object size, the number of records, a minimum time, a maximum time, and an object creation time,
wherein the block metadata includes a block ID, a table ID, an object ID, the number of records, a minimum time, a maximum time, a start position of the block, and a block creation time, and
wherein the block column metadata includes a column ID, a block ID, a column name, a column type, an offset in the block, a length of the block, and a creation time.

4. The computer-implemented system of claim 3, wherein the computer-executable instructions cause the one or more processors to further perform:
a fourth step of receiving a query execution request from a client;
a fifth step of parsing the query received in the fourth step to extract information on a target to be queried;
a sixth step of querying the block metadata database for block metadata based on the information extracted in the fifth step;
a seventh step of requesting the block storage to execute the query and receiving a query result;
an eighth step of requesting the object storage to execute the query and receiving a query result; and
a ninth step of merging the query result of the seventh step and the query result of the eighth step and returning the merged result to the client.

* * * * *